US012744018B2

(12) United States Patent
Wang

(10) Patent No.: US 12,744,018 B2
(45) Date of Patent: Sep. 22, 2026

(54) IMAGE OUTPUT CONTROL DEVICE AND METHOD

(71) Applicant: REALTEK SEMICONDUCTOR CORPORATION, Hsinchu (TW)

(72) Inventor: Jhih-Jie Wang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 124 days.

(21) Appl. No.: 18/791,436

(22) Filed: Aug. 1, 2024

(65) Prior Publication Data

US 2025/0078776 A1 Mar. 6, 2025

(30) Foreign Application Priority Data

Sep. 5, 2023 (TW) ................................ 112133697

(51) Int. Cl.
*G06T 1/60* (2006.01)
*G09G 5/00* (2006.01)

(52) U.S. Cl.
CPC ......... *G09G 5/001* (2013.01); *G09G 2320/04* (2013.01); *G09G 2360/12* (2013.01)

(58) Field of Classification Search
CPC ....... G06T 1/20; G06T 2200/00; G06T 15/00; G06T 17/00; G06T 15/005; G06T 15/08; G06T 17/10; G06F 7/00; G06F 7/02; G06F 7/24; G06F 7/505; G06F 9/3885; G09G 5/001; G09G 5/022; G09G 2320/0285; G09G 2320/04; G09G 2360/123; G09G 2360/12; G09G 3/002; G09G 3/2029; G09G 3/2044; G09G 5/393; H04N 9/3179; H04N 9/3182; H04N 7/01
USPC .......................................................... 345/530
See application file for complete search history.

(56) References Cited

U.S. PATENT DOCUMENTS

| | | | | |
|---|---|---|---|---|
| 2003/0053797 A1* | 3/2003 | Oshima ................ | H04N 19/597 | |
| | | | 348/E13.059 | |
| 2012/0050613 A1* | 3/2012 | Halna Du Fretay ... | H04N 9/475 | |
| | | | 348/E9.034 | |
| 2012/0173751 A1* | 7/2012 | Braness ............. | H04N 21/6587 | |
| | | | 709/231 | |
| 2021/0182540 A1* | 6/2021 | Cower ................... | H04N 19/21 | |

* cited by examiner

*Primary Examiner* — Gordon G Liu
(74) *Attorney, Agent, or Firm* — WPAT, P.C.; Anthony King

(57) ABSTRACT

An image output control device is provided. The image output control device includes a storage device and a controller. The storage device sequentially stores first input frames corresponding to a first frame rate and second input frames corresponding to a second frame rate. The controller records a start writing position of the second input frames in the storage device, and reads a first frame and a second frame from the storage device according to a reading position. When the reading position does not exceed the start writing position, the controller reads the first and second frames from the first input frames of the storage device corresponding to the first frame rate. When the reading position reaches or exceeds the start writing position, the controller reads the first and second frames from the second input frames of the storage device corresponding to the second frame rate.

19 Claims, 7 Drawing Sheets

IMAGE OUTPUT CONTROL DEVICE AND METHOD

CROSS-REFERENCE TO RELATED APPLICATIONS

This application claims priority of Taiwan application No. 112133697 filed on Sep. 5, 2023, which is incorporated by reference in its entirety.

TECHNICAL FIELD

The present application relates to the image output control device and method for variable frame rate.

BACKGROUND

In an image processing application, Motion Estimation and Motion Compensation (MEMC) technology can be used to generate an interpolated frame between two original frames to make the image frame smoother. In multimedia content with Quick Media Switching (QMS) or variable frame rate, frame rate of the video will switch dynamically, therefore, it is important to control output of the frames after MEMC compensation.

SUMMARY OF THE INVENTION

The present application discloses an image output control device. The image output control device includes a storage device and a controller. The storage device is configured to sequentially store a plurality of first input frames corresponding to a first frame rate and a plurality of second input frames corresponding to a second frame rate in image data. The controller is configured to record a start writing position of the second input frames in the storage device, and provide a control signal to the storage device to set a reading position of the storage device, so as to read a first frame and a second frame from the storage device. When the reading position does not exceed the start writing position, the controller is configured to read the first and second frames from the plurality of first input frames of the storage device corresponding to the first frame rate. When the reading position reaches or exceeds the start writing position, the controller is configured to read the first and second frames from the plurality of second input frames of the storage device corresponding to the second frame rate.

Furthermore, the present application discloses an image output control method. The image output control method includes: writing image data into a storage device, wherein the image data comprises a plurality of first input frames corresponding to a first frame rate and a plurality of second input frames corresponding to a second frame rate; recording a start writing position of the plurality of second input frames in the storage device when the written image data converts from the plurality of first input frames to the plurality of second input frames; setting a reading position of the storage device so as to read a first frame and a second frame from the storage device; reading the plurality of first input frames of the storage device corresponding to the first frame rate as the first frame and the second frame when the reading position of the storage device does not exceed the start writing position; and reading the plurality of second input frames of the storage device corresponding to the second frame rate as the first frame and the second frame when the reading position of the storage device reaches or exceeds the start writing position.

In summary, the content of the output frames provided by the image output control device and method corresponds to the actual frame rate, and therefore has good fluency. This avoids image acceleration or deceleration caused by frame drops or lags during transition period of frame rate conversion.

BRIEF DESCRIPTION OF THE DRAWINGS

Aspects of the present disclosure are best understood from the following detailed description when read with the accompanying drawings. It is noted that, in accordance with the common practice in the industry, various features are not drawn to scale. In fact, the dimensions of various features may be arbitrarily increased or reduced for clarity of discussion.

DETAILED DESCRIPTION

Figure 1:
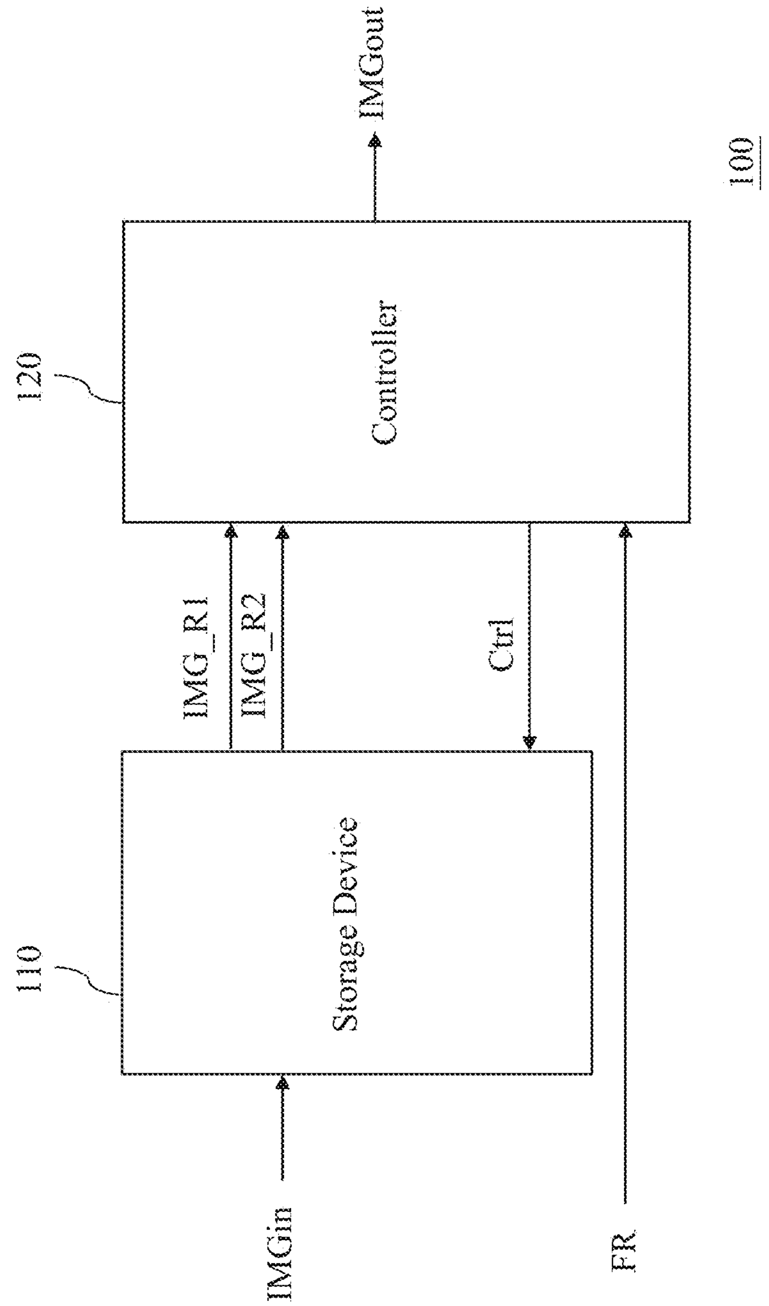
FIG. 1 is a schematic diagram illustrating an image output control device according to one embodiment of the present disclosure.

FIG. 1 is a schematic diagram illustrating an image output control device 100 according to one embodiment of the present disclosure. The image output control device 100 is configured to perform image processing (such as interpolation compensation) on an input frame IMGin of the image data and provide an output frame IMGout to a display (not shown) for playback. In some embodiments, the image output control device 100 is implemented in an integrated circuit (IC). The interpolation compensation may be Motion Estimation and Motion Compensation (MEMC) or any other image compensation methods.

The image output control device 100 includes a storage device 110 and a controller 120. The controller 120 is configured to provide a control signal Ctrl to the storage device 110, so as to control the access operation of the storage device 110. In some embodiments, the storage device 110 may include a memory or a buffer. After receiving image data containing variable frame rates (such as multimedia content containing 24 Hz frames and 60 Hz frames), the image output control device 100 is configured to sequentially store each of the received input frames IMGin into the storage device 110. Further, the controller 120 is configured to detect the frame rate change in the image data based on the frame rate FR of each of the input frames IMGin, and record the storage position of the corresponding input frames IMGin in the storage device 110. The information of the frame rate FR may be provided by another device or is included in the information of the input frames IMGin.

The controller 120 is configured to read the frame IMG_R1 and the frame IMG_R2 from the storage device 110, and to perform interpolation compensation on the frames IMG_R1 and IMG_R2, so as to generate an interpolated frame between the frames IMG_R1 and IMG_R2 as the output frame IMGout. When a frame rate change in the input frames IMGin is detected, the controller 120 further provides the control signal Ctrl to the storage device 110, so as to read the frames IMG_R1 and IMG_R2 corresponding to the frame rate of the stored input frames IMGin. For multimedia contents with Quick Media Switching (QMS), the output frame provided by conventional image output controller does not correspond to the actual frame rate, which may cause the acceleration or deceleration of video. Compared with the conventional image output controller, the output frames IMGout provided by the image output control device 100 corresponds to the actual frame rate, resulting in smoother playback for videos.

Figure 2:
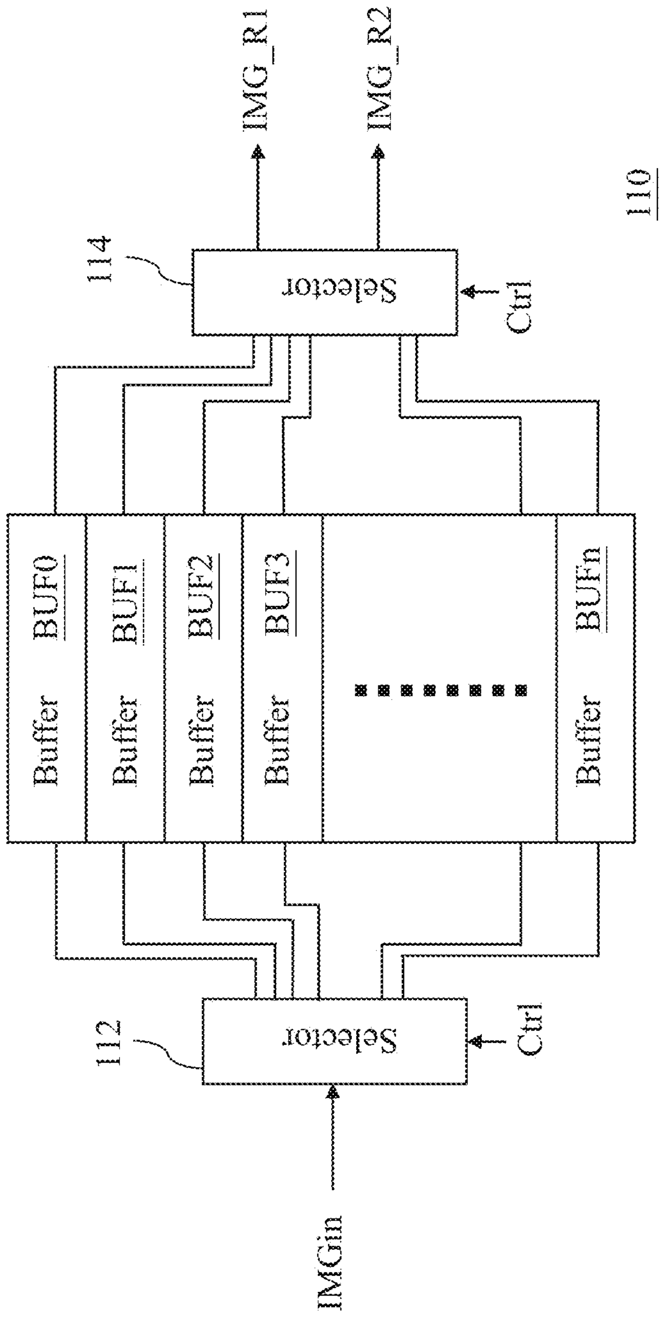
FIG. 2 is a schematic diagram illustrating a storage device according to one embodiment of the present disclosure.

FIG. 2 is a schematic diagram illustrating the storage device 110 according to one embodiment of the present disclosure. The storage device 110 includes a plurality of buffers BUF0-BUFn and the selectors 112 and 114. Each of the input frames IMGin is stored in an individual buffer. In some embodiments, the buffers BUF0-BUFn are different buffering areas in one buffer. In response to a writing position (or a write address) assigned by the control signal Ctrl, the selector 112 is configured to write the input frame IMGin into a corresponding buffer. In some embodiments, the selector 112 is configured to sequentially write each of the input frames IMGin into the buffer BUF0 to the buffer BUFn according to the control signal Ctrl. In some embodiments, the selector 112 may include a switching circuit or a demultiplexer. Similarly, in response to a reading position (or a reading address) assigned by the control signal Ctrl, the selector 114 is configured to read the frames IMG_R1 and IMG_R2 from the corresponding buffers. In some embodiments, the frames IMG_R1 and IMG_R2 are two adjacent input frames IMGin that are written into the storage device 110 consecutively. In some embodiments, the selector 114 may include a switching circuit or a multiplexer. In some embodiments, the storage device 110 may be a memory, and the storage device 110 is capable of storing the input frames IMGin and reading the frames IMG_R1 and IMG_R2 according to the access information (such as the read address, the write address, etc.) of the control signal Ctrl.

Figure 3:
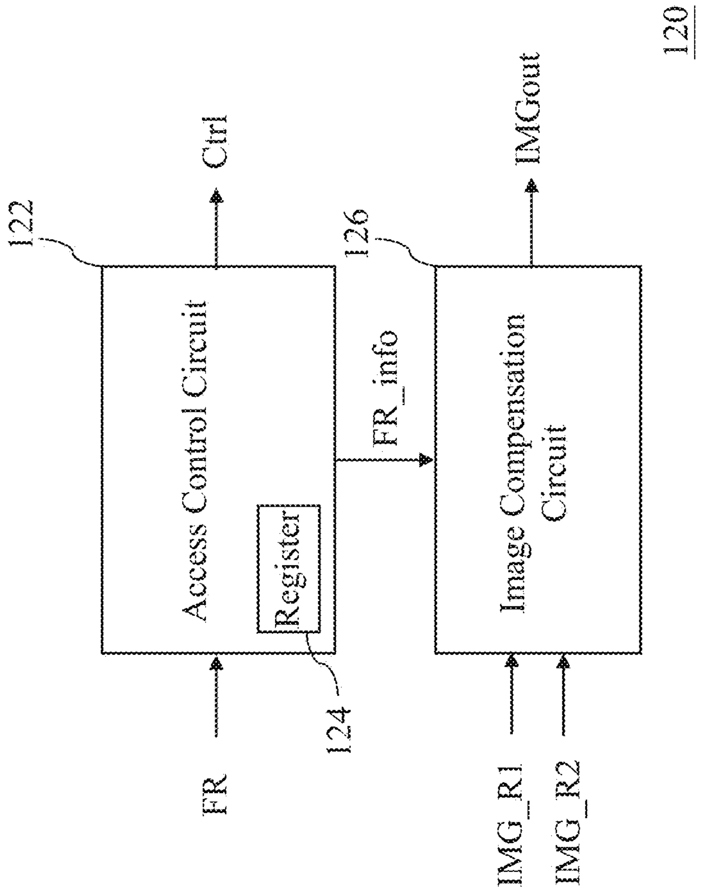
FIG. 3 is a schematic diagram illustrating a controller according to one embodiment of the present disclosure.

FIG. 3 is a schematic diagram illustrating the controller 120 according to one embodiment of the present disclosure. The controller 120 includes an access control circuit 122 and an image compensation circuit 126. The access control circuit 122 is configured to provide the control signal Ctrl for controlling the access operations of the storage device 110. The access control circuit 122 includes a register 124. The access control circuit 122 is configured to store the writing positions of the input frames IMGin and the reading positions of the frames IMG_R1 and IMG_R2 in the register 124, and to provide the writing positions and reading positions to the storage device 110 through the control signal Ctrl. Furthermore, when the frame rate FR of the input frames IMGin changes, the access control circuit 122 is configured to store the writing position of the input frame IMGin corresponding to a new frame rate in the register 124 for use as a start writing position of frame rate conversion. The access control circuit 122 is configured to dynamically adjust the reading positions of the frames IMG_R1 and IMG_R2 according to the start writing position of frame rate conversion, so as to read the corresponding frames IMG_R1 and IMG_R2 from the storage device 110 corresponding to the variable frame rate.

Figure 4:
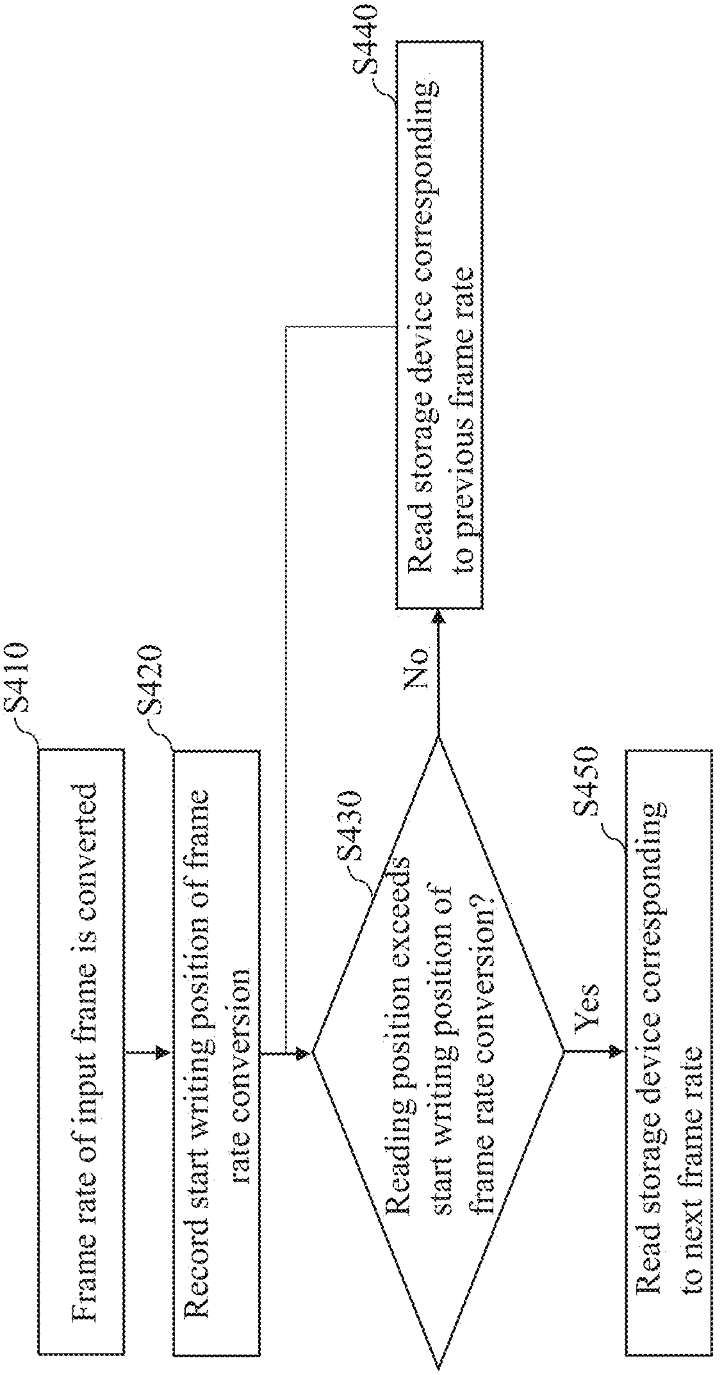
FIG. 4 is a flow chart disclosing how an access control circuit reads a storage device during frame rate conversion according to one embodiment of the present disclosure.

Reference to FIG. 4, FIG. 4 is a flow chart disclosing how the access control circuit 122 reads the storage device 110 during frame rate conversion according to one embodiment of the present disclosure.

In operation S410, the access control circuit 122 detects that the input frame IMGin written into the storage device 110 is converted (or changed) from a previous frame rate to the next frame rate. For example, the input frame IMGin written into the storage device 110 is converted from the first frame rate FR1 (e.g., a previous frame rate or a frame rate before conversion) to the second frame rate FR2 (e.g., the next frame rate or the converted frame rate).

In operation S420, the access control circuit 122 records the writing position of the first input frame IMGin corresponding to the second frame rate FR2 in the storage device 110, in the register 124 as the start writing position of frame rate conversion. In some embodiments, the start writing position of frame rate conversion is recorded as the writing position of the last input frame IMGin corresponding to the first frame rate FR1.

In operation S430, the access control circuit 122 determines whether the reading positions of the frames IMG_R1 and IMG_R2 in the storage device 110 exceed or reach the recorded start writing position of frame rate conversion.

In operation S440, when the reading position does not exceed the start writing position of frame rate conversion, the access control circuit 122 is configured to set the reading position of the storage device 110 corresponding to the first frame rate FR1 (i.e., the previous frame rate), so as to read the frame corresponding to the first frame rate FR1 in the storage device 110, such that the frames IMG_R1 and IMG_R2 are read from the storage device 110 corresponding to the first frame rate FR1.

In operation S450, when the reading position exceeds or reaches the start writing position of frame rate conversion, the access control circuit 122 is configured to set the reading position of the storage device 110 corresponding to the second frame rate FR2 (i.e., the converted frame rate), in order to read the frames corresponding to the second frame rate FR2 in the storage device 110, so that the frames IMG_R1 and IMG_R2 are read from the storage device 110 corresponding to the second frame rate FR2, until the next frame rate conversion occurs or the reading operation of the storage device 110 is completed. Thus, the image content read during operations S440 and S450 matches its frame rate.

Referring back to FIG. 3, the access control circuit 122 further provides the frame rate information FR_info to the image compensation circuit 126, so as to provide information such as the frame rates corresponding to the frames IMG_R1 and IMG_R2 respectively, or the frame rate ratio of the frames IMG_R1 and IMG_R2, etc., to the image compensation circuit 126. In some embodiments, the frames IMG_R1 and IMG_R2 are two consecutive adjacent frames, and the frame IMG_R1 is the previous frame of the frame IMG_R2. In some embodiments, the image compensation circuit 126 obtains the frames IMG_R1 and IMG_R2 from the storage device 110 at the same time. In some embodiments, the image compensation circuit 126 obtains the frames IMG_R1 and IMG_R2 from the storage device 110 in sequence.

According to the frame rate information FR_info and the display frame rate (or refresh rate) of a display (not shown), the image compensation circuit 126 obtains a compensation phase (or blending coefficient) MC_phase corresponding to the frames IMG_R1 and IMG_R2 and compensates the frames IMG_R1 and IMG_R2 according to the compensation phase MC_phase, so as to generate and provide the output frame IMGout corresponding to the display frame rate to the display. Generally, the display frame rate of the display is greater than the frame rates of the frames IMG_R1 and IMG_R2 or equal to the frame rate of the frame IMG_R1 or IMG_R2. For example, when the display frame rate of the display is 120 Hz and the frame rate of the frames IMG_R1 and IMG_R2 is 24 Hz, the image compensation circuit 126 obtains five compensation phase values of the compensation phase based on the ratio of the frame rates of the display and the frames IMG_R1 and IMG_R2 (i.e., 120 Hz/24 Hz). Thus, the image compensation circuit 126 is configured to perform interpolation compensation (or blending) on the frames IMG_R1 and IMG_R2 according to each compensation phase value of the compensation phase, to generate individual output frames IMGout. In other words, for the frames IMG_R1 and IMG_R2 from the storage device 110, the image compensation circuit 126 is configured to provide five output frames IMGout to the display according to the five compensation phase values of the compensation phase.

The controller 120 of the present disclosure may be implemented utilizing any suitable form, including hardware circuitry, software, firmware, or any combination thereof. At least a portion of the controller 120 may optionally be implemented as computer software running on one or more image processors, data processors and/or digital signal processors or configurable module elements (e.g., FPGAs).

Figure 5:
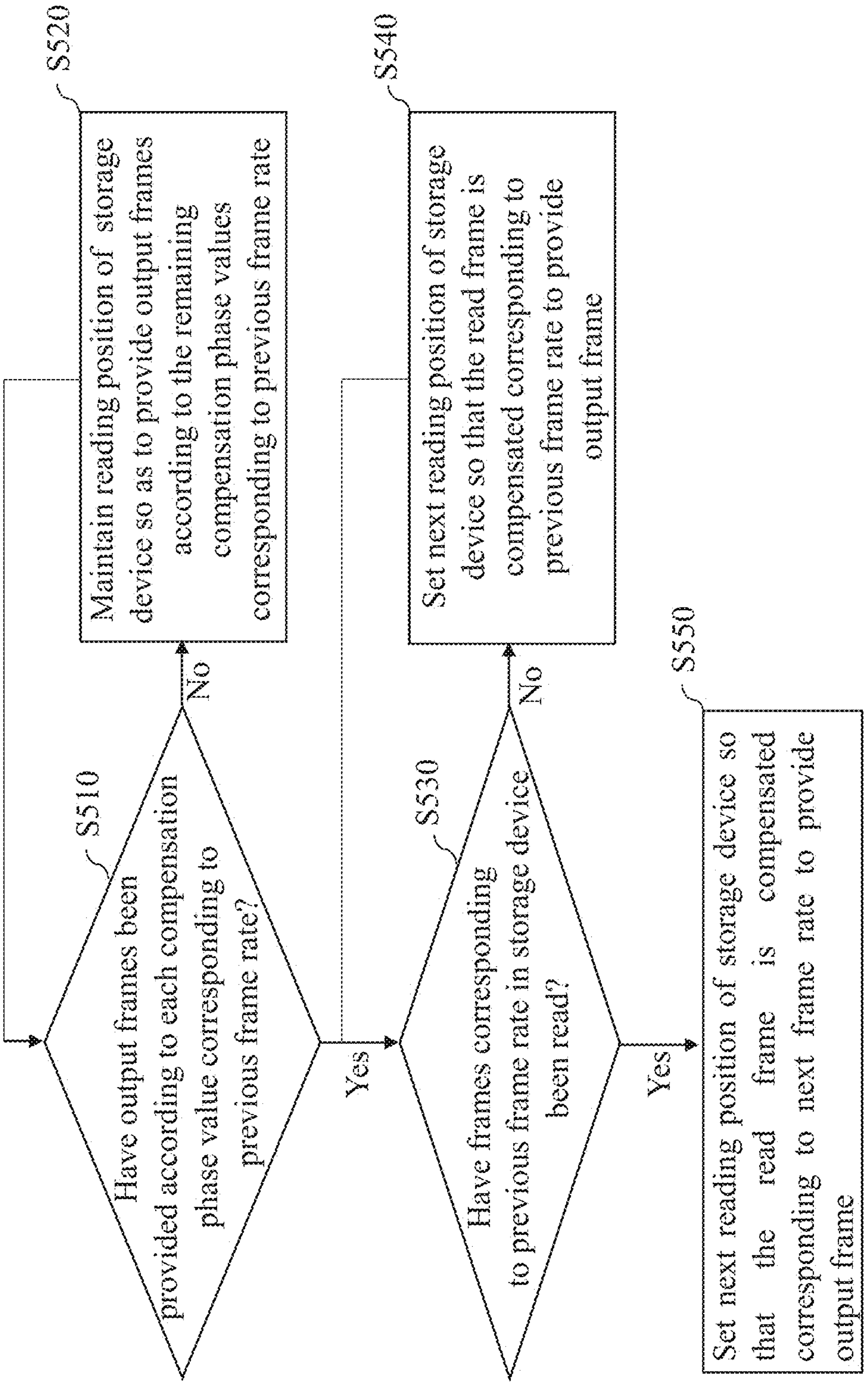
FIG. 5 is a flowchart disclosing how an image compensation circuit compensates the phases during frame rate conversion according to one embodiment of the present disclosure.

FIG. 5 is a flowchart disclosing how the image compensation circuit 126 compensates the phases during frame rate conversion according to one embodiment of the present disclosure.

In operation S510, after the access control circuit 122 detects that the input frames IMGin written into the storage device 110 convert from the first frame rate FR1 (e.g., a previous frame rate or a frame rate before conversion) to the second frame rate FR2 (e.g., the next frame rate or the converted frame rate), the image compensation circuit 126 of the controller 120 is configured to determine, based on the frame rate information FR_info, whether the output frames have been provided for the image frames IMG_R1 and IMG_R2 according to each compensation phase value of the compensation phase corresponding to the first frame rate FR1 (i.e., the previous frame rate). The amount of the compensation phase values is determined by the frame rate of the read frames IMG_R1 and IMG_R2 and the display frame rate.

In operation S520, when the image frames IMG_R1 and IMG_R2 are not compensated according to all the compensation phase values so as to provide the output image frame IMGout (that is, a part of the compensation phase values have not been used to compensate the frames IMG_R1 and IMG_R2), the access control circuit 122 is configured to maintain the reading position of the storage device 110, so that the image compensation circuit 126 can continue to perform compensation on the frames IMG_R1 and IMG_R2 according to the remaining compensation phase values (i.e., the unused compensation phase values) corresponding to the first frame rate FR1 (i.e., the previous frame rate), so as to provide the output frame IMGout.

In operation S530, when the image frames IMG_R1 and IMG_R2 are compensated according to all the compensation phase values so as to provide the output image frame IMGout, the access control circuit 122 is configured to determine whether all the input frames IMGin corresponding to the first frame rate FR1 in the storage device 110 have been read. In some embodiments, the access control circuit 122 determines whether all the input frames IMGin corresponding to the first frame rate FR1 in the storage device 110 have been read on the basis that whether the reading position of the storage device 110 has reached the start writing position of frame rate conversion in the register 124.

In operation S540, when the input frames IMGin corresponding to the first frame rate FR1 in the storage device 110 are not read completely, the access control circuit 122 continues to set the next reading position of the storage device 110 to continue reading the frames IMG_R1 and IMG_R2 corresponding to the first frame rate FR1, so that the image compensation circuit 126 can perform compensation on the frames IMG_R1 and IMG_R2 corresponding to the first frame rate FR1 (i.e., the previous frame rate), so as to provide the output frame IMGout, until all the input frames IMGin corresponding to the first frame rate FR1 in the storage device 110 have been read.

In operation S550, after all the input frames IMGin corresponding to the first frame rate FR1 in the storage device 110 have been read, the access control circuit 122 continues to set the next reading position of the storage device 110 to read the frames IMG_R1 and IMG_R2 corresponding to the second frame rate FR2 (i.e., the next frame rate), so that the image compensation circuit 126 can perform compensation on the frames IMG_R1 and IMG_R2 corresponding to the second frame rate FR2, so as to provide the output frame IMGout, until the next frame rate conversion occurs or the reading operation of the storage device 110 is completed.

Figure 6A:
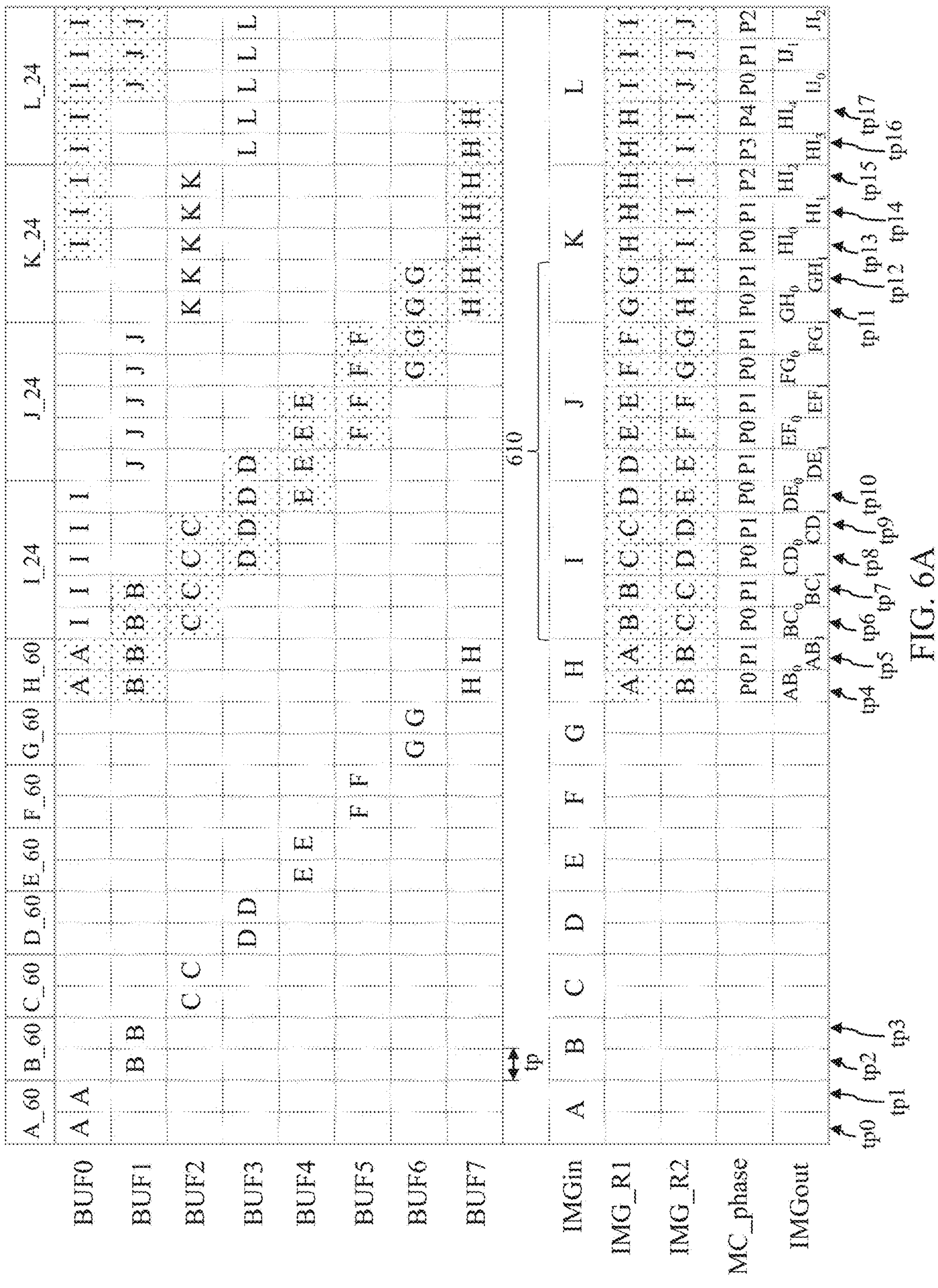
FIG. 6A and FIG. 6B are diagrams of the relationship between frame and time in an image output control device according to one embodiment of the present disclosure.
Figure 6B:
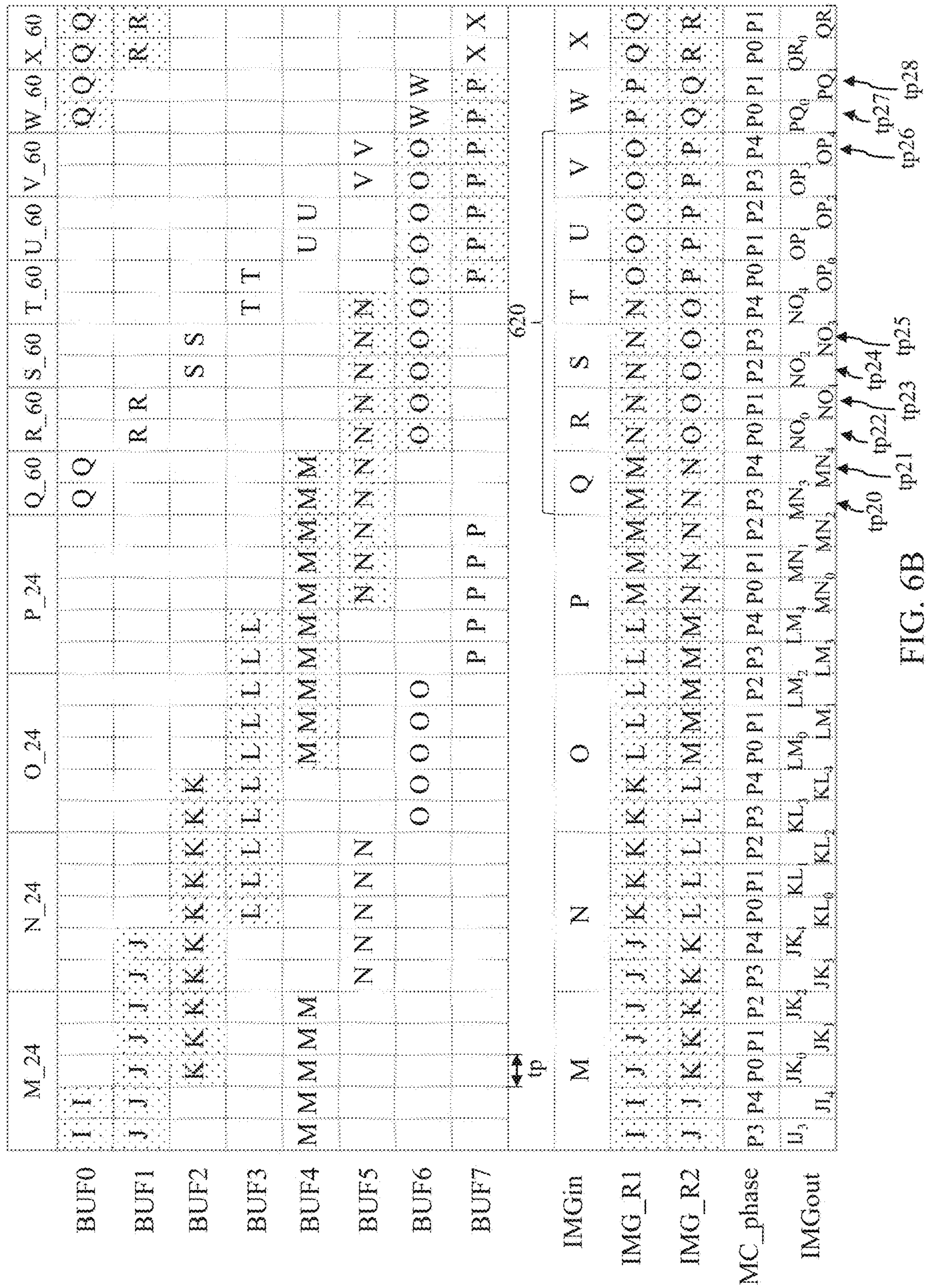

FIG. 6A and FIG. 6B are diagrams of the relationship between frame and time in the image output control device 100 according to one embodiment of the present disclosure. In the present embodiment, the storage device 110 has eight buffers BUF0-BUF7. Furthermore, the image output control device 100 is configured to convert the image data having a frame rate of 60 Hz (i.e., 60 FPS) and a frame rate of 24 Hz (i.e., 24 FPS) and then output the converted image data to a display having a display frame rate (or refresh rate) of 120 Hz. In FIG. 6A and FIG. 6B, the time period tp is determined by the display frame rate 120 Hz of the display. Furthermore, according to the ratio between the display frame rate and frame rate of the frames, a frame having a 60 Hz frame rate corresponds to two time periods tp, and a frame having a 24 Hz frame rate corresponds to five time periods tp.

In FIG. 6A, the frames A, B, C, D, E, F, G and H having a frame rate of 60 Hz and the frames I, J, K and L having a frame rate of 24 Hz of the image data are sequentially written into the buffers of the storage device 110, wherein each frame is written into an individual buffer. For example, in the time periods tp0 and tp1, the frame A is used as the input frame IMGin and written into the buffer BUF0. Next, in the time periods tp2 and tp3, the frame B is used as the input frame IMGin and written into the buffer BUF1, and so on. As discussed above, the writing positions of the input frames IMGin are determined by the controller 120.

In the time periods tp4 and tp5, the frame His used as the input frame IMGin and written into the buffer BUF7. In the meantime, in response to the reading position of the control signal Ctrl, the frames A and B stored in the buffers BUF0 and BUF1 are read and serve as the frames IMG_R1 and IMG_R2. In the present embodiment, the frame A and the frame B are two consecutive frames. The image compensation circuit 126 obtains two compensation phase values P0 and P1 for the compensation phase MC_phase of the frame A and the frame B, according to the frame rate of the frames A and B and the display frame rate of the display. In the time period tp4, the image compensation circuit 126 performs compensation on the frame A and the frame B according to the compensation phase value P0 to obtain a compensated frame $AB_0$, and provides the compensated frame $AB_0$ to the display as the output frame IMGout. Next, in the time period tp5, the image compensation circuit 126 performs compensation on the frame A and the frame B according to the compensation phase value P1 to obtain a compensated frame $AB_1$, and provides the compensated frame $AB_1$ to the display as the output frame IMGout. In some embodiments, the image content of the compensated frame $AB_0$ is determined by the frame A, and the image content of the compensated frame $AB_1$ is determined by the frame A and the frame B in a weighted manner.

In FIG. 6A and FIG. 6B, the image compensation circuit 126 obtains two compensation phase values P0 and P1 of the compensation phase MC_phase corresponding to the two frames having a frame rate of 60 Hz, and the image compensation circuit 126 obtains five compensation phase values P0, P1, P2, P3 and P4 of the compensation phase MC_phase corresponding to the two frames having a frame rate of 24 Hz. It should be noted that the compensation operations of the image compensation circuit 126 are provided for illustrative purposes and are not intended to limit the present disclosure; any dynamic compensation methods for images may be applicable in the present disclosure.

From the time period tp6 to the time period tp10, the frame I having a frame rate of 24 Hz is used as the input frame IMGin and written into the buffer BUF0, and the frame A previously stored in the buffer BUF0 has been read in the time periods tp4 and tp5. When the frame I is inputted into the storage device 110 (such as in the time period tp6), the controller 120 detects that the input frames IMGin converted from a frame rate of 60 Hz to a frame rate of 24 Hz (operation S410), and records the start writing position of the frame rate conversion (operation S420), such as recording the start writing position of the frame rate conversion as the position of the buffer BUF0.

In the time period tp6, in response to the reading position of the control signal Ctrl, the frames B and C stored in the buffers BUF1 and BUF2 are read as the frames IMG_R1 and IMG_R2. Next, the image compensation circuit 126 performs compensation on the frame B and the frame C according to the compensation phase value P0 to obtain a compensated frame $BC_0$, and provides the compensated frame $BC_0$ to the display as the output frame IMGout.

In the time period tp7, since the reading position has not exceeded the start writing position of the frame rate conversion (operation S430), the access control circuit 122 sets the reading position of the storage device 110 corresponding to the frame rate of 60 Hz (i.e., the previous frame rate), so as to read the storage device 110 (operation S440). In the meantime, since the image compensation circuit 126 has not performed compensation on the frame B and the frame C according to the compensation phase value P1 (operation S510), the controller 120 is configured to maintain the reading position in order to continue to read the frame B and the frame C, perform compensation on the frame B and the frame C according to the compensation phase value P1 to obtain the compensated frame $BC_1$, and provide the compensated frame $BC_1$ to the display as the output frame IMGout (operation S520). In certain embodiments, the image content of the compensated frame $BC_0$ is determined by the frame B, and the image content of the compensated frame $BC_1$ is determined by the frame B and the frame C in a weighted manner.

In the time periods tp8 and tp9, since the reading position has not exceeded the start writing position of the frame rate conversion (operation S430), the access control circuit 122 sets the reading position of the storage device 110 corresponding to the frame rate of 60 Hz (i.e., the previous frame rate), in order to read the storage device 110 (operation S440). Furthermore, not all of the frames corresponding to the frame rate of 60 Hz in the storage device 110 have been read (operation S530), and thus the controller 120 sets the reading positions as the buffers BUF2 and BUF3 (operation S540). In this way, the frames C and D stored in the buffers BUF2 and BUF3 are respective read as the frames IMG_R1 and IMG_R2. In the time periods tp8 and tp9, the image compensation circuit 126 performs compensation on the frame C and the frame D according to the compensation phase values P0 and P1, so as to obtain the compensated frames $CD_0$ and $CD_1$, respectively, and provide the compensated frames $CD_0$ and $CD_1$ to the display as the output frame IMGout.

From the time period tp11 to the time period tp15, the frame K having a frame rate of 24 Hz is used as the input frame IMGin and written into the buffer BUF2, whereas the frame C previously stored in the buffer BUF2 has been read from the time period tp6 to the time period tp9.

In the time periods tp11 and tp12, since the reading position has not exceeded the start writing position of the frame rate conversion (operation S430) and the frames corresponding to the frame rate of 60 Hz in the storage device 110 have not been read completely (operation S530), the controller 120 sets the reading positions as the buffers BUF6 and BUF7 (operation S540). In this way, the frames G and H stored in the buffers BUF6 and BUF7 are read, respectively, as the frames IMG_R1 and IMG_R2. The image compensation circuit 126 perform compensation on the frame G and the frame H according to compensation phase values P0 and P1, so as to obtain the compensated frames $GH_0$ and $GH_1$, respectively, and provide the compensated frames $GH_0$ and $GH_1$ to the display as the output frame IMGout.

In the time period tp13, since the reading position reaches the start writing position of the frame rate conversion (operation S430), the access control circuit 122 sets the reading position of the storage device 110 according to the frame rate of 24 Hz (i.e., the next frame rate), in order to read the storage device 110 (operation S450). Furthermore, the frames corresponding to the frame rate of 60 Hz (i.e., the previous frame rate) in the storage device 110 have all be read (operation S530), and thus the controller 120 sets the buffers BUF7 and BUF0 as the reading positions (operation S550). In this way, the frames H and I stored in the buffers BUF7 and BUF0 are read from the time period tp13 to the time period tp17 as the frames IMG_R1 and IMG_R2, respectively. From the time period tp13 to the time period tp17, the image compensation circuit 126 performs compensation on the frame H and the frame I according to the compensation phase values P0 to P4, to obtain the compensated frames $HI_0$, $HI_1$, $HI_2$, $HI_3$ and $HI_4$, respectively, and provide the same to the display as the output frame IMGout.

In FIG. 6A, during the transition period 610 of frame rate conversion from the time period tp6 (i.e., the frame rate of the input image frame IMGin is converted) to the time period tp12 (i.e., all the frames corresponding to the frame rate of 60 Hz in the storage device 110 have been read), the controller 120 may calculate, select, and use the frames corresponding to the frame rate of 60 Hz according to the frame rate of 60 Hz (i.e., the previous frame rate) to generate the output frame IMGout, until the frames corresponding to the frame rate of 60 Hz have been read completely. Therefore, compared to conventional image output control device that immediately adopts a new frame rate (i.e., the next frame rate) to read and generate output frames when the frame rate of the input frames IMGin is converted, the content of the output frame IMGout provided by the image output control device 100 corresponds to its actual frame rate, and thus has better fluency. Furthermore, when the image data having a variable frame rate is dynamically converted, the image output control device 100 can avoid image acceleration or deceleration caused by frame drops or lags during the transition period of frame rate conversion. In a conventional image output control device, when the number of buffers is larger, the image content of the output frame is more likely to be inconsistent with the actual frame rate during the transition period of frame rate conversion.

In FIG. 6B, the frames M, N, O and P having a frame rate of 24 Hz and frame Q, R, S, T, U, V, W and X having a frame rate of 60 Hz in the image data are sequentially used as the input frames IMGin and written into the buffers of the storage device 110, wherein each frame is written into an individual buffer. As discussed above, the writing positions of the input frames IMGin are determined by the controller 120.

In the time periods tp20 and tp21, the frame Q having a frame rate of 60 Hz is used as the input frame IMGin and written into the buffer BUF0, and the frame I previously stored in the buffer BUF0 has been read in a previous time period. When the frame Q is inputted to the storage device 110 (such as in the time period tp20), the controller 120 detects that the input frames IMGin is converted from the frame rate of 24 Hz to the frame rate of 60 Hz (operation S410), and records the start writing position of the frame rate conversion (operation S420), such as recording the start writing position of the frame rate conversion as the position of the buffer BUF0.

In the time period tp20, since the reading position has not exceeded the start writing position of the frame rate conversion (operation S430), the access control circuit 122 sets the reading position of the storage device 110 corresponding to the frame rate of 24 Hz (i.e., the previous frame rate), in order to read the storage device 110 (operation S440). In the meantime, since the image compensation circuit 126 has not performed compensation on the frame M and the frame N according to the compensation phase values P3 and P4 (operation S510), the controller 120 maintains the reading position in order to continue reading out the frame M and the frame N, and performs compensation on the frame M and the frame N according to the compensation phase values P3 and P4 in the time period tp20 and tp21, respectively, so as to provide the compensated frames MN3 and MN4 to the display as the output frame IMGout (operation S520).

In the time periods tp22 and tp23, the frame R having a frame rate of 60 Hz is used as an input frame IMGin and written into the buffer BUF1. Furthermore, the frames N and O stored in the buffers BUF5 and BUF6 are read and used as the frames IMG_R1 and IMG_R2, respectively. Next, the image compensation circuit 126 performs compensation on the frame N and the frame O according to compensation phase values P0 and P1 to respectively obtain the compensated frames $NO_0$ and $NO_1$, and provides the same to the display as the output frame IMGout. Next, in the time periods tp24 and tp25, the frame S is used as an input frame IMGin and written into the buffer BUF1. Furthermore, the frame N and O stored in the buffers BUF5 and BUF6 will continue to be read and used as the frames IMG_R1 and IMG_R2, respectively. Next, the image compensation circuit 126 performs compensation on the frame N and the frame O according to compensation phase values P2 and P3 to respectively obtain the compensated frames $NO_2$ and $NO_3$, and provides the same to the display as the output frame IMGout. By analogy, when the operation proceeds to the time period tp26, all the frames corresponding to the frame rate of 24 Hz (i.e., the previous frame rate) in the storage device 110 are read (operation S530) and compensated correspondingly, so as to provide the output frame IMGout (operation S550).

In the time period tp27, since the reading position reaches the start writing position of the frame rate conversion (operation S430), the access control circuit 122 sets the reading position of the storage device 110 corresponding to the frame rate of 60 Hz (i.e., the next frame rate), in order to read the storage device 110 (operation S450). Furthermore, all the frames corresponding to the frame rate of 24 Hz (i.e., the previous frame rate) in the storage device 110 have been read (operation S530), and thus, the controller 120 sets the reading position as the buffers BUF7 and BUF0 (operation S550). In this way, the frames P and Q stored in the buffers BUF7 and BUF0 are read and used as the frames IMG_R1 and IMG_R2 in the time periods tp27 and tp28. In the time periods tp27 and tp28, the image compensation circuit 126 performs compensation on the frames P and the frames Q according to the compensation phase values P0 and P1 to respectively obtain the compensated frame $PQ_0$ and $PQ_1$, and provides the same to the display as the output frame IMGout.

In FIG. 6B, during the transition period 620 of frame rate conversion from the time period tp20 (i.e., the frame rate of the input image frame IMGin is converted) to the time period tp26 (i.e., all the frames corresponding to the frame rate of 24 Hz in the storage device 110 have been read), the controller 120 may calculate, select, and use the frames corresponding to the frame rate of 24 Hz according to the frame rate of 24 Hz (i.e., the previous frame rate) to generate the output frame IMGout, until the frames corresponding to the frame rate of 24 Hz have been read completely. Therefore, compared to conventional image output control device that immediately adopts a new frame rate (i.e., the next frame rate) to read and generate output frames when the frame rate of the input frames IMGin is converted, the content of the output frame IMGout provided by the image output control device 100 corresponds to its actual frame rate, and thus has better fluency. Furthermore, when the image data having a variable frame rate is dynamically converted, the image output control device 100 can avoid image acceleration or deceleration caused by frame drops or lags during the transition period of frame rate switch.

Although the preferred embodiments of the present disclosure have been described above, they are not used to limit the present disclosure, and a person having ordinary skill in the art will be able to make certain changes and modifications without departing from the spirit and scope of the disclosure, and thus, the protection scope of the present disclosure is defined by the annexed claims.

What is claimed is:

1. An image output control device, comprising:

a storage device configured to sequentially store a plurality of first input frames corresponding to a first frame rate and a plurality of second input frames corresponding to a second frame rate in image data;

a controller configured to record a start writing position of the plurality of second input frames in the storage device, and provide a control signal to the storage device to set a reading position of the storage device, so as to read two consecutive stored frames from the storage device as a first frame and a second frame, wherein when the reading position of the storage device does not exceed the start writing position, the controller is configured to read the first frame and the second frame from the plurality of first input frames stored in the storage device according to the first frame rate, and when the reading position of the storage device exceeds the start writing position, the controller is configured to read the first frame and the second frame from the plurality of second input frames stored in the storage device according to the second frame rate, wherein the first frame rate is different from the second frame rate.

2. The image output control device of claim 1, wherein the controller is configured to perform compensation on the first frame and the second frame to provide a plurality of output frames to a display, wherein the plurality of output frames correspond to a display frame rate of the display.

3. The image output control device of claim 2, wherein the display frame rate is greater than or equal to the first frame rate or the second frame rate.

4. The image output control device of claim 2, wherein when the reading position of the storage device does not exceed the start writing position, the amount of the plurality of output frames is determined by a ratio between the display frame rate and the first frame rate.

5. The image output control device of claim 2, wherein when the reading position of the storage device reaches or exceeds the start writing position, the amount of the plurality of output frames is determined by a ratio between the display frame rate and the second frame rate.

6. The image output control device of claim 1, wherein in response to each of the reading positions of the storage device, the controller is configured to provide a plurality of compensation phase values corresponding to the display frame rate of the display according to the frame rates of the first and second frames, and in response to each of the compensation phase values, the controller is configured to provide the output frame to the display according to the first frame and the second frame.

7. The image output control device of claim 6, wherein when the first frame and the second frame are the plurality of first input frames, the controller is configured to provide the plurality of compensation phase values according to the first frame rate, and the amount of the plurality of compensation phase values is determined by a ratio between the display frame rate and the first frame rate.

8. The image output control device of claim 6, wherein when the first frame and the second frame are the plurality of second input frames, the controller is configured to provide the plurality of compensation phase values according to the second frame rate, and the amount of the plurality of compensation phase values is determined by a ratio between the display frame rate and the second frame rate.

9. The image output control device of claim 6, wherein when the reading position of the storage device reaches the start writing position, the first frame and the second frame are respectively last frame of the plurality of first input frames and first frame of the plurality of second input frames stored in the storage device, the controller is configured to provide the plurality of compensation phase values according to the second frame rate, and the amount of the plurality of compensation phase values is determined by a ratio between the display frame rate and the second frame rate.

10. An image output control method, comprising:

writing image data into a storage device, wherein the image data comprises a plurality of first input frames corresponding to a first frame rate and a plurality of second input frames corresponding to a second frame rate;

recording a start writing position of the plurality of second input frames in the storage device when the written image data converts from the plurality of first input frames to the plurality of second input frames;

setting a reading position of the storage device so as to read two consecutive stored frames from the storage device as a first frame and a second frame;

reading the plurality of first input frames of the storage device according to the first frame rate as the first frame and the second frame when the reading position of the storage device does not exceed the start writing position; and reading the plurality of second input frames of the storage device according to the second frame rate as the first frame and the second frame when the reading position of the storage device exceeds the start writing position, wherein the first frame rate is different from the second frame rate.

11. The image output control method of claim 10, further comprising:

performing compensation on the first frame and the second frame, to provide a plurality of output frames to a display, wherein the plurality of output frames correspond to a display frame rate.

12. The image output control method of claim 11, wherein the display frame rate is a refresh rate of the display, and the display frame rate is greater than or equal to the first frame rate or the second frame rate.

13. The image output control method of claim 11, wherein when the plurality of first input frames of the storage device have not been completely read, the amount of the plurality of output frames is determined by a ratio between the display frame rate and the first frame rate.

14. The image output control method of claim 11, wherein when the plurality of first input frames of the storage device have been completely read, the amount of the plurality of output frames is determined by a ratio between the display frame rate and the second frame rate.

15. The image output control method of claim 10, further comprising:

in response to each of the reading positions of the storage device, providing a plurality of compensation phase values corresponding to the display frame rate of the display according to the frame rates of the first and second frames; and performing compensation on the first frame and the second frame according to each of the compensation phase values, to provide the output frame to the display.

16. The image output control method of claim 15, further comprising:

when the written image data converts from the plurality of first input frames to the plurality of second input frames and has not performed compensation on the first and second frames according to each of the compensation phase values, performing compensation on the first frame and the second frame corresponding to the first frame rate according to the remaining compensation phase values to provide the output frame, wherein the amount of the plurality of compensation phase values is determined by a ratio between the display frame rate and the first frame rate.

17. The image output control method of claim 15, further comprising:

performing compensation on the first frame and the second frame corresponding to the first frame rate according to each of the compensation phase values to provide the output frame when the reading position of the storage device does not exceed the start writing position, wherein the amount of the plurality of compensation phase values is determined by a ratio between the display frame rate and the first frame rate.

18. The image output control method of claim 15, further comprising:

performing compensation on the first frame and the second frame corresponding to the second frame rate according to each of the compensation phase values to provide the output frame when the reading position of the storage device reaches or exceeds the start writing position, wherein the amount of the plurality of compensation phase values is determined by a ratio between the display frame rate and the second frame rate.

19. The image output control method of claim 15, further comprising:

performing compensation on the first frame and the second frame corresponding to the second frame rate according to each of the compensation phase values to provide the output frame when the reading position of the storage device reaches the start writing position and the first frame and the second frame are respectively last frame of the plurality of first input frames and first frame of the plurality of second input frames stored in the storage device, wherein the amount of the plurality of compensation phase values is determined by a ratio between the display frame rate and the second frame rate.

* * * * *